(12) United States Patent
Ouchchen

(10) Patent No.: US 11,390,730 B2
(45) Date of Patent: Jul. 19, 2022

(54) ZEOLITE-BASED ADDITIVE SUITABLE FOR POLYMER PROCESSING

(71) Applicant: Plastic Science By Design BVBA, Lokeren (BE)

(72) Inventor: Assia Ouchchen, Lokeren (BE)

(73) Assignee: Plastic Science By Design BVBA, Lokeren (BE)

( * ) Notice: Subject to any disclaimer, the term of this patent is extended or adjusted under 35 U.S.C. 154(b) by 11 days.

(21) Appl. No.: 16/958,788

(22) PCT Filed: Dec. 26, 2018

(86) PCT No.: PCT/IB2018/060617
§ 371 (c)(1),
(2) Date: Jun. 29, 2020

(87) PCT Pub. No.: WO2019/130216
PCT Pub. Date: Jul. 4, 2019

(65) Prior Publication Data
US 2020/0332097 A1    Oct. 22, 2020

(30) Foreign Application Priority Data

Dec. 29, 2017 (BE) .................................. 2017/6023
Jun. 22, 2018 (BE) .................................. 2018/5436

(51) Int. Cl.
| | |
|---|---|
| *C08L 23/06* | (2006.01) |
| *B29C 48/00* | (2019.01) |
| *C08J 3/22* | (2006.01) |
| *B29K 23/00* | (2006.01) |
| *B29K 105/00* | (2006.01) |

(52) U.S. Cl.
CPC ............ *C08L 23/06* (2013.01); *B29C 48/022* (2019.02); *C08J 3/226* (2013.01); *B29K 2023/06* (2013.01); *B29K 2023/12* (2013.01); *B29K 2105/0005* (2013.01); *C08L 2201/08* (2013.01); *C08L 2205/025* (2013.01); *C08L 2205/03* (2013.01); *C08L 2205/035* (2013.01); *C08L 2205/06* (2013.01); *C08L 2310/00* (2013.01)

(58) Field of Classification Search
CPC ................................ B29C 48/022; C08J 3/226
See application file for complete search history.

(56) References Cited

U.S. PATENT DOCUMENTS

| | | |
|---|---|---|
| 4,740,341 A | 4/1988 | Chu |
| 6,156,421 A | 12/2000 | Stopper et al. |
| 6,642,310 B2 | 11/2003 | Chapman, Jr. et al. |
| 2005/0011622 A1 | 1/2005 | Sabourin |
| 2010/0086767 A1* | 4/2010 | Thottupurathu ........ B29C 48/08 428/316.6 |
| 2018/0319963 A1* | 11/2018 | Devisme ............... B29C 48/022 |
| 2019/0256669 A1* | 8/2019 | Kulkarni .............. C08G 81/027 |

FOREIGN PATENT DOCUMENTS

| | | | |
|---|---|---|---|
| CN | 103788477 A | 5/2014 | |
| CN | 105524448 A | 4/2016 | |
| EP | 1000966 A1 | 5/2000 | |
| EP | 3156428 A1 | 4/2017 | |
| FR | 3044672 A1 * | 6/2017 | ............. C08J 3/226 |
| WO | 2011025052 A1 | 3/2011 | |

OTHER PUBLICATIONS

Lee, "Die Lip Build-Up in the Filled Low Density Polyethylene Wire and Cable Extrusion," The International Wire & Cable Symposium, Nov. 2001, 10 pages.
WIPO, ISR for PCT/IB2018/060617, Feb. 27, 2019.

* cited by examiner

*Primary Examiner* — Arrie L Reuther
(74) *Attorney, Agent, or Firm* — Hodgson Russ LLP

(57) ABSTRACT

In a first aspect, the present invention relates to a process improvement additive suitable for polymer processing, wherein this process improvement additive comprises a carrier polymer, a binding component and one or more fluoropolymers and wherein this process improvement additive further comprises one or more zeolites. In a second aspect, the present invention relates to a method for processing a polymer, wherein a process improvement additive is added to the polymer prior to processing and wherein this process improvement additive comprises a carrier polymer, a binding component, one or more fluoropolymers and one or more zeolites.

16 Claims, No Drawings

ZEOLITE-BASED ADDITIVE SUITABLE FOR POLYMER PROCESSING

TECHNICAL FIELD

The invention relates to a process improvement additive suitable for application in polymer processing. It is located in the technical sub-discipline of polymer chemistry, in particular polymer processing and its optimisation.

PRIOR ART

Accumulation of polymer material around the extrusion head, or 'die build-up', during extruding, often results in inconsistent or poor performance of the polymer film formed. This accumulation of polymer material also results in degradation of the polymer and deposition of fillers due to prolonged heating around the extrusion die. These degradation products can come loose from the extrusion die during extrusion and give rise to 'black holes' or 'black spots' in the polymer product formed. These defects in the polymer product can cause underperformance and are often unattractive.

Accumulation of polymer material around the extrusion die mainly concerns the accumulation of low molecular weight polymers or gels, which arise during the extrusion due to polymer degradation due to exposure to high temperatures and exposure to friction. The addition of antioxidants can often reduce this accumulation due to heat and friction. For example, U.S. Pat. No. 6,156,421 describes the addition of a sterically hindered phenol to reduce polymer accumulation around the extrusion die.

U.S. Pat. No. 4,740,341 describes the addition of a fluoropolymer, such as polyvinylidene fluoride, in order to improve the extrusion of linear low-density polyethylene (LLDPE). The fluoropolymer acts as a lubricant and forms a coating around the extrusion die, as a result of which the polymer to be extruded is exposed to less friction and die build-up significantly decreases as a result. Similarly, U.S. Pat. No. 6,642,310 describes the optimisation of the extrusion process of polyethylene by adding a fluoropolymer with an average particle size greater than 2 μm.

Although the addition of antioxidants and fluoropolymers significantly reduces die build-up by reducing the degradation of polyethylene and the formation of low molecular weight polymers and gel formation, the formation of black spots and black holes is not completely excluded. Especially with multimodal polyethylene extrusion, die build-up is a common problem.

The use of zinc stearate and calcium stearate to reduce die build-up is known from US 2005/011622, and commercial compounds are available that use fluoropolymers and zinc stearate to improve polymer extrusion. The zinc stearate serves as an acid scavenger and, in combination with the application of fluoropolymers and/or antioxidants, can effectively counteract die build-up. However, as discussed in 'Die lip build-up in the filled low-density polyethylene wire and cable extrusion', C. D. Lee, Equistar Chemicals, LP, published by LyondellBasell Industries, it is difficult to determine the dosage of stearates to limit die build-up. After all, the concentration of stearates in which die build-up is minimal is in a very narrow range. If the dose of stearate is too high or too low, die build-up will not be reduced, but potentially promoted. This is, of course, an undesirable effect and a major uncertainty factor.

In conclusion, new methods and/or additives are needed to reduce die build-up in order to solve this problem, which the polymer industry still faces today. The present invention aims to solve the problem mentioned above by providing a new additive composition which reduces die build-up and is easy to dose.

BRIEF SUMMARY OF THE INVENTION

For the above purpose, the present invention provides, in a first aspect, a process improvement additive suitable for polymer processing according to claim 1, wherein this process improvement additive comprises a carrier polymer, one or more fluoropolymers and one or more zeolites. Zeolites serve as acid scavenger and have the advantage vis-à-vis commonly used acid scavengers such as zinc stearate that they are easy to dose without introducing an increased risk of die build-up.

Preferred forms of this process improvement additive are given in claims 2 to 14.

According to an embodiment, the process improvement additive comprises one or more zeolites in a total concentration comprised between 0.25 and 1.25 m %. Preferably, the concentration is between 0.25 and 1.25 m %, even more preferably between 0.25 and 1.00 m %. It has been established that a process improvement additive with a maximum of 1.00 m % of zeolites has a maximum acid scavenging capacity.

According to a further embodiment, the process improvement additive comprises one or more fluoropolymers with a total concentration comprised between 1.00 and 4.00 m %, more preferably between 1.00 and 3.50 m %, even more preferably between 1.00 and 3.00 m %. The presence of fluoropolymers in the process improvement additive provides a dynamic, rheological coating that protects the extrudate during extrusion. In a most preferred form, the maximum concentration of fluoropolymers is 2.95 m %. Use of fluoropolymers in these concentration ranges implies good lubricating properties with respect to the extrusion head and/or extrusion screw.

According to a further embodiment, the process improvement additive comprises one or more antioxidants with a total concentration comprised between 0.50 and 3.00 m %, preferably between 0.50 and 2.00 m %, even more preferably between 0.50 and 1.70 m %. The antioxidants present in the process improvement additive counteract the degradation of the polymer into low molecular weight compounds.

An embodiment of the present invention comprises the zeolites in a ratio comprised between 1:4 and 1:2 in relation to the fluoropolymers. The synergistic effect between the different additive components was greatest when this specific ratio was used. As a result, less additive was needed to achieve the desired beneficial effect.

A second aspect of the present invention concerns a method for the processing of polymers according to claim 15, wherein a process improvement additive is added to the polymer prior to processing and wherein this process improvement additive comprises a carrier polymer, a binding component, one or more fluoropolymers and one or more zeolites.

Preferred embodiments of this method are given in claims 16 to 19.

According to an embodiment of the method, the process improvement additive is diluted in the polymer to be formed in a ratio comprised between 1:10 and 1:150, preferably between 1:75 and 1:150. Dilution of the process improvement additive according to this ratio implies an efficient reduction of die build-up.

According to a further embodiment of the method, the processing method of the polymer is selected from the group of extrusion, extrusion blow moulding, blown film extrusion, injection moulding, compression moulding and thermoforming.

DETAILED DESCRIPTION

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments.

When the term 'around' or 'about' is used in this document with a measurable quantity, a parameter, a duration or moment, and the like, then variations are meant of approx. 20% or less, preferably approx. 10% or less, more preferably approx. 5% or less, even more preferably approx. 1% or less, and even more preferably approx. 0.1% or less than and of the quoted value, insofar as such variations are applicable in the described invention. However, it must be understood that the value of a quantity used where the term 'about' or 'around' is itself specifically disclosed.

The terms 'comprise', 'comprising', 'consist of', 'consisting of', 'provided with', 'include', 'including', 'contain', 'containing', are synonyms and are inclusive or open terms that indicate the presence of what follows, and which do not exclude or prevent the presence of other components, characteristics, elements, members, steps, as known from or disclosed in the prior art.

Quoting numerical intervals by the endpoints comprises all integers, fractions and/or real numbers between the endpoints, these endpoints included.

A 'polymer' is a chemical compound with a molecular structure consisting of a sequence of linked, identical or specific parts. Polymers may be subdivided according to their properties in the categories: thermoplastic, thermosetting and elastomeric, which are meltable, non-meltable or difficult to melt and possess elastic properties, respectively.

The physical shape of a polymer is determined during the 'polymer processing' and may include techniques such as extrusion, extrusion blow moulding, blown film extrusion, injection moulding, compression moulding and thermoforming.

'Extrusion' is a processing technique in which a deformable material, in this context a polymer, is pressed through an extrusion nozzle. The machine that makes this possible is called the 'extruder'. The mould contains specially designed holes that shape the final material. Extrusion can be both continuous and discontinuous, and there are various variations, including cold and hot extrusion.

'Blow moulding' is a processing technique for the production of hollow-shaped polymers and may or may not be directly linked to an extrusion process, namely 'extrusion blow moulding'. With the aid of a gas, for example compressed air, the soft thermoplastic material is inflated so that it is pressed against a mould. After cooling, the thermoplastic retains its final shape.

The term 'blown film moulding' or 'blown film extrusion' refers to a processing technique for the production of polymer films and is directly linked to an extrusion process. In the blown film moulding, a hollow tube is extruded which is then inflated to a bubble with a diameter several times larger. This bubble is cooled during and/or after inflation. The cooled film is then guided by a set of pinch rolls, which causes the bubble to break into two flat films.

'Injection moulding' is a processing technique for the production of low melting point polymers and may or may not be directly linked to an extrusion process. The plastic is injected under high pressure into a mould the cavity of which has the shape of the desired product. After cooling, the thermoplastic retains its final shape.

'Compression moulding' is a processing technique in which the material to be formed is placed in an open mould, after which the mould is closed under high pressure.

'Thermoforming' is a processing technique in which mainly plate materials are shaped by heating them up and then clamping them into a specific mould shape.

The 'Melt Flow Index (MFI)' is a gauge of the fluid behaviour of a polymer material. The longer the molecular chain, the higher the viscosity of the polymer and the higher the MFI. The MFI is determined by allowing a certain amount of polymer to flow through a tube of defined length and diameter at constant temperature and pressure. The time is measured, where the MFI is expressed in mass flowing in a unit of time. 'Masterbatch' means a solid or liquid additive used in the production of polymers to provide the final product with specific properties. For example, a masterbatch can be used to give the polymer a specific colour, or to build in, for example, a fire retardant or antimicrobial effect.

'Die build-up' is the accumulation of polymer material and/or its degradation products on the mould wall or other parts of the extruder. Such deposition may occur due to an incorrectly chosen temperature, an excessive difference in MFI between the polymer and the masterbatch, poor mixability or the presence of harmful components in the polymer mixture, etc. Die build-up often gives rise to visible 'black spots' and 'black holes'. These defects are not only unattractive, but can also negatively affect the performance and/or strength of the polymer.

A 'process improvement additive' is a component that is added to a process to improve its overall functioning or to minimise or resolve related problems. A process improvement additive is usually added in very low concentrations in order not to affect the properties of the end product.

The 'binding component' means a component which is added to a composition in order to better blend its various components. The binding component also ensures a smooth mixing of the process improvement additive and the polymer product in the context of the process improvement additive.

A 'fluoropolymer' is a polymer whose molecular structure comprises one or more fluorine atoms. These polymers are generally very resistant to solvents, acids and bases and have a very low friction resistance due to their fluorine content. This makes fluoropolymers extremely suitable as a friction-reducing component.

An 'antioxidant' is a component that is able to neutralise free radicals. Industrially, they are often used as stabilisers to prevent oxidation. In polymer chemistry, antioxidants are used to counteract the oxidative degradation of polymers so as to ensure the strength and flexibility of the final product.

'Zeolites' are minerals belonging to the tectosilicates and are constructed from silicon, aluminium and oxygen atoms. Zeolites usually have a very porous structure and can be used as e.g. molecular sieves, ion exchangers or as a catalyst. Zeolites are also very suitable as acid scavenger.

In a first aspect, the invention concerns a process improvement additive suitable for polymer processing, wherein this process improvement additive comprises a carrier polymer, one or more fluoropolymers and one or more zeolites. Use of the process improvement additive during polymer processing significantly reduces the risk of black spots, black holes and the formation of gels, which is a direct effect of the specific composition of this additive. The fluoropolymers present in the additive form a dynamic, rheological coating around the extrusion screw and/or head, the jacket and the extrusion nozzle, which has lubricating properties, thereby reducing the accumulation of degradation products of the polymer due to heat and friction. Zeolites act as acid scavenger, which helps reduce the reactivity and degradation of the polymer. Unlike the commonly used zinc stearate, these zeolites have the advantage that they are easy to dose and that they always have the effect of reducing die build-up during processing. Zinc stearate, however, may actually increase die build-up in case of a limited under- or overdose, which is an undesirable side effect. Polymer processing in which the combination of one or more zeolites, one or more antioxidants and one or more zeolites was added to the polymer to be moulded provides a higher quality end product with clearly less visible and invisible defects than when another masterbatch or additive composition is used. An additional benefit of this process improvement additive is that the screw speed can be increased during extrusion without additional risk of die build-up, black spots and/or black holes occurring. A higher permissible screw speed also implies an increased production speed. In addition, the use of this process improvement additive results in reduced melting pressure, reduced extrusion temperature and reduced gel formation, which ultimately results in an extruded product of higher quality.

According to an embodiment of the present invention, the process improvement additive comprises one or more zeolites that serve as acid scavenger and are selected from the group of analcime, clinoptilotite, chabazite, laumontite, mazzite, heulandite, stilbite, natrolite, mordenite, gottardite and brewsterite. In known process additives to improve polymer processing, calcium or zinc stearate is often used as acid scavenger. However, the disadvantage of this compound is that it only has an optimal effect in a very narrow range, so that a small under- or overdose actually increases the risk of formation of black spots and black holes. Zeolites also have acid-scavenging properties, but remain optimally effective in a wide concentration range. This makes dosage simple and ensures an unambiguous reduction of the risk of black spots and black holes during the polymer processing.

Preferably, the process improvement additive comprises one or more zeolites in a total concentration comprised between 0.25 and 1.25 m %. Preferably, the concentration is between 0.25 and 1.25 m %, even more preferably between 0.25 and 1.00 m %. It has been established that a process improvement additive with a maximum of 1.00 m % of zeolites has a maximum acid scavenging capacity, without negatively affecting polymer processing.

According to a further embodiment, the process improvement additive comprises one or more fluoropolymers with a total concentration comprised between 1.00 and 4.00 m %, more preferably between 1.00 and 3.50 m %, even more preferably between 1.00 and 3.00 m %. In a most preferred form, the maximum concentration of fluoropolymers is 2.95 m %. Use of fluoropolymers in these concentration ranges implies good lubricating properties with respect to the extrusion screw and/or head, the jacket and the extrusion nozzle, thereby minimising the accumulation of any degradation products during polymer processing, without negatively affecting said processing. In addition, the need for maintenance of the extrusion screw, jacket, extrusion nozzle and other parts when using the process improvement additive is minimal to absent. As a result, the production process can be continued continuously for a longer period of time when using the process improvement additive without having to interrupt the process due to maintenance or to solve common problems. Since a process interruption, and in particular the restart of the production process, creates a significant amount of waste material, a smaller number of interruptions also implies a smaller amount of waste. Since production takes place at lower temperatures and at reduced melting pressure, the waste produced is of such quality that it can be reused as source material. This drastically reduces the amount of waste as a whole when using the process improvement additive.

In particular, the fluoropolymers will be selected from the group of polyvinyl fluoride (PVF), polyethylene tetrafluoroethylene (ETFE), polyvinylidene fluoride (PVDF) and tetrafluoroethylene propylene (FEPM), preferably from the group of PVF and ETFE. These fluoropolymers exhibit highly lubricating properties and as a direct result reduce the accumulation of polymer and its degradation products around the walls of the mould and the extrusion screw. This makes maintenance when using this process improvement additive unnecessary, which means that the production process has a longer continuous duration and less waste is produced as a result of stopping and restarting production.

According to an embodiment, the process improvement additive comprises one or more antioxidants with a total concentration comprised between 0.50 and 3.00 m %, preferably between 0.50 and 2.00 m %, even more preferably between 0.50 and 1.70 m %. The antioxidants present in the process improvement additive counteract the degradation of the polymer into low molecular weight compounds. In the presence of antioxidants with a concentration comprised between 0.50 and 3.00 m %, radicals are neutralised and the reactivity of the process mixture is reduced sufficiently to minimise the formation of black spots in the final product. The antioxidants have no negative influence on the polymer processing within this concentration range. The antioxidants comprise 20 m % octadecyl 3-(3,5-di-tert-butyl-4-hydroxyphenyl)propionate and 80 m % tris(2,4-di-tert-butylphenyl) phosphite, said composition being commercially available in powder form as e. g. Irganox B900 (BASF). This specific composition has already proven to be a good antioxidant composition for use in polymer extrusion. The advantage of this composition is that it is compatible with a broad spectrum of polymers, namely polyethylene, ethylene vinyl acetate copolymers, polycarbonates, polyesters, styrene homo- and copolymers, polyurethanes and other elastomers. The antioxidant compound provides a solid thermostability and counteracts the degradation of the polymer during processing. The various components present in the current process improvement additive exhibit a synergistic effect with this antioxidant compound, which significantly reduces the risk of formation of black spots, black holes and gel formation.

An embodiment of the present invention comprises the zeolites in a ratio comprised between 1:4 and 1:2 in relation to the fluoropolymers. The synergistic effect between the different additive components was greatest when this specific ratio was used. As a result, less additive was needed to achieve the desired beneficial effect. Preferably, this ratio is comprised between 3:10 and 4:10.

According to an embodiment, the process improvement additive comprises a binding component, namely ethylene oxide, and the carrier polymer is selected from the group of polyethylene (PE), polypropylene (PP), polycarbonates, polyesters, polyurethanes (PU), polyvinyl chloride (PVC), styrenes (polystyrene, acrylonitrile-butadiene-styrene (ABS) and styrene-acrylonitrile (SAN)) and other elastomers. The use of ethylene oxide as a binding component ensures good mixing between the different components of the process improvement additive on the one hand and good mixing of the additive into the material to be formed on the other. A homogeneous distribution of the additive in the polymer material is essential to obtain a final product with a homogeneous quality and functionality.

A further or other embodiment of the process improvement additive comprises sodium carbonate in a concentration comprised between 0.50 and 5.00 m % in the process improvement additive. Sodium carbonate has an additional cleansing effect on the extrusion screw and head, the jacket and the extrusion nozzle, thereby further optimising the extrusion. Preferably, sodium carbonate is present in a concentration comprised between 1.00 and 3.00 m %, even more preferably this concentration is comprised between 1.50 and 2.50 m %. Most preferably, sodium carbonate is present in a concentration of 2.00 m % with respect to the total process improvement additive.

In a preferred embodiment, the present invention comprises a process improvement additive comprising:
- a total concentration between 0.25 and 1.50 m %, more preferably between 0.25 and 1.25 m %, even more preferably between 0.25 and 1.00 m % of one or more zeolites;
- a total concentration between 1.00 and 4.00 m %, more preferably between 1.00 and 3.50 m %, even more preferably between 1.00 and 3.00 m % of one or more fluoropolymers;
- a total concentration between 0.50 and 3.00 m %, more preferably between 0.50 and 2.00 m %, even more preferably between 0.50 and 1.70 m % of one or more antioxidants;
- ethylene oxide as binding component and a carrier polymer;
- a concentration between 0.50 and 5.00 m %, more preferably between 1.00 and 3.00 m %, even more preferably between 1.50 and 2.50 m % of sodium carbonate.

A second aspect of the present invention concerns a method for the processing of polymers, wherein a process improvement additive is added to the polymer prior to processing and wherein this process improvement additive comprises a carrier polymer, a binding component, one or more fluoropolymers and one or more zeolites.

According to an embodiment of the method, the process improvement additive is diluted in the polymer to be formed in a ratio comprised between 1:10 and 1:150, preferably between 1:75 and 1:150. Dilution of the process improvement additive according to this ratio implies an efficient reduction of die build-up and the associated formation of black spots and black holes. A dilution between these ratios also has the advantage that the additive is administered sparingly, which simplifies the logistics in this regard. Use of the process improvement additive has the additional advantage that the concentration of a colour masterbatch can be reduced to 50%. The process improvement additive ensures that pigments are more dispersed during the plasticising process. This implies more efficient and economical colouring. In addition, a faster colour transition and protection of the extrudate during extrusion can be achieved when using this process improvement additive if the concentration is increased to a maximum of 5%. This allows a quick and efficient transition between successive colour masterbatches. When dosing the process improvement additive, in ideal conditions a colour transition can be achieved that takes place twice as fast as in the absence of this process improvement additive. A rapid colour transition implies that only a small amount of waste material is created during the colour transition. In addition, optical properties of the resulting polymer, such as transparency, are also improved as a result of the application of this process improvement additive.

According to a further embodiment, the polymer to be formed is selected from the group of polyethylene (PE), polypropylene (PP), polycarbonates, polyesters, polyurethanes (PU), polyvinyl chloride (PVC), styrenes (polystyrene, acrylonitrile-butadiene-styrene (ABS) and styrene-acrylonitrile (SAN)) and other elastomers. The carrier polymer of the process improvement additive is usually coordinated with the polymer to be formed in question.

According to a further embodiment of the method, the processing of the polymer comprises one or more techniques selected from the group of extrusion, extrusion blow moulding, blown film extrusion, injection moulding, compression moulding and thermoforming. Extrusion includes cold and hot extrusion in both continuous and discontinuous form. Blow extrusion and blown film extrusion also fall into this category. Products resulting from these techniques include containers, bottles and foils. Containers produced using this process improvement additive showed an increased top load, which means that the end product can withstand a greater pressure from the top without being dented. The top load could be increased by 15%. Since a specific top load is imposed on each product, these products can be produced lighter without compromising on strength.

In what follows, the invention will be described by way of non-limiting examples illustrating the invention, and which are not intended to and should not be interpreted as limiting the scope of the invention.

EXAMPLES

The invention will now be further explained on the basis of the following examples, without however being limited to this.

Example 1: Composition of a Clinoptilotic Process Improvement Additive

Example 1 refers to a clinoptilotic process improvement additive that is suitable for processing polyethylene.

| component | concentration (m %) |
| --- | --- |
| clinoptilotite | 0.50 |
| polyvinyl fluoride | 0.80 |
| polyethylene tetrafluoroethylene | 0.80 |
| Irganox B900 | 0.80 |
| ethylene oxide | 0.10 |
| polyethylene | 97.00 |

Adding this process improvement additive for processing polyethylene has a variety of advantages. By applying this process improvement additive, an increased production speed is achieved as a result of an increased screw speed of the extruder. Specifically, the screw speed can be increased by 5 RPM without having a detrimental effect on the quality of the formed polymer. In addition, processing can take place at lower temperatures and lower melting pressure. Specifically, the temperature can be reduced by about 20° C. compared to processing without applying this process improvement additive. As a result, a product can be formed in which black holes and black spots are absent. The overall quality of the polymer is also improved as a result of reduced gel production.

The use of this process improvement additive has the additional advantage that production can be continued continuously for longer, i. e. less maintenance is needed, and less general problems arise, which means that the production line only rarely needs to be stopped and restarted. This reduces waste generation. In addition, the waste material created during production can be efficiently reused as new source material.

The above benefits together generate energy savings of around 4% and entail significant annual cost reductions.

Example 2: Composition of an Analcime- and Natrolite-Containing Process Improvement Additive Example 2 refers to an analcime- and natrolite-containing process improvement additive that is suitable for processing polypropylene.

| component | concentration (m %) |
|---|---|
| analcime | 0.30 |
| natrolite | 0.30 |
| polyvinyl fluoride | 0.80 |
| polyethylene tetrafluoroethylene | 0.50 |
| tetrafluoroethylene propylene | 0.30 |
| Irganox B900 | 0.70 |
| ethylene oxide | 0.10 |
| polypropylene | 97.00 |

This analcime- and natrolite-containing process improvement additive optimises the processing of polypropylene significantly. For example, the melting pressure and operating temperature during extrusion is reduced and a production rate is obtained that is up to 50% higher than if this process improvement additive is not applied. The quality of the extruded product is also higher due to improved gel formation. The gel quality decreases by up to 30% by using this process improvement additive.

The invention claimed is:

1. A process improvement additive suitable for polymer processing, wherein the process improvement additive comprises a carrier polymer, a binding component and one or more fluoropolymers, characterised in that this process improvement additive further comprises one or more zeolites at a concentration between 0.25 to 1.25 m % and the zeolite is gottardite.

2. The process improvement additive according to claim 1, characterised in that the fluoropolymers have a concentration in the process improvement additive comprised between 1.00 and 4.00 m %.

3. The process improvement additive according to claim 2, characterised in that the concentration of the fluoropolymers in the process improvement additive is comprised between 1.00 and 3.50 m %.

4. The process improvement additive according to claim 1, characterised in that the process improvement additive comprises one or more antioxidants, which have a total concentration in the process improvement additive comprised between 0.50 and 3.00 m %.

5. The process improvement additive according to claim 4, characterised in that the total concentration of the antioxidants in the process improvement additive is comprised between 0.50 and 2.00 m%.

6. The process improvement additive according to claim 1, characterised in that the zeolites relate to the fluoropolymers according to a mass ratio comprised between 1:4 and 1:2.

7. The process improvement additive according to claim 1, characterised in that the process improvement additive comprises one or more fluoropolymers chosen from polyvinyl fluoride (PVF), polyethylene tetrafluoroethylene (ETFE), polyvinylidene fluoride (PVDF) and tetrafluoroethylene propylene (FEPM).

8. The process improvement additive according to claim 7, characterised in that the process improvement additive comprises one or more fluoropolymers chosen from PVF and ETFE.

9. The process improvement additive according to claim 1, characterised in that the process improvement additive comprises antioxidants octadecyl-3-(3,5-di-tert-butyl-4-hydroxyphenyl)-propionate and tris-(2,4-di-tert-butylphenyl)-phosphite according to a mass ratio of 1:4.

10. The process improvement additive according to claim 1, characterised in that the binding component comprises ethylene oxide and the carrier polymer is chosen from polyethylene (PE), polypropylene (PP), polycarbonates, polyesters, polyurethanes (PU), polyvinyl chloride (PVC), styrenes, and other elastomers.

11. The process improvement additive according to claim 1, characterised in that the process improvement additive further comprises sodium carbonate in a concentration comprised between 0.50 and 5.00 m % in the process improvement additive.

12. A method for the processing of polymers, wherein a process improvement additive is added to the polymer prior to processing, characterised in that the process improvement additive is an additive according to claim 1.

13. The method according to claim 12, characterised in that the process improvement additive is diluted in the polymer according to a dilution factor comprised between 1:10 and 1:150.

14. The method according to claim 13, characterised in that the dilution factor is comprised between 1:75 and 1:150.

15. The method according to claim 12, wherein the polymer is chosen from polyethylene (PE), polypropylene (PP), polycarbonates, polyesters, polyurethanes (PU), polyvinyl chloride (PVC), styrenes, and other elastomers.

16. The method according to claim 12, wherein the processing of the polymer comprises one or more techniques chosen from extrusion, extrusion blow moulding, blown film extrusion, injection moulding, compression moulding and thermoforming.

* * * * *